Figure 1:
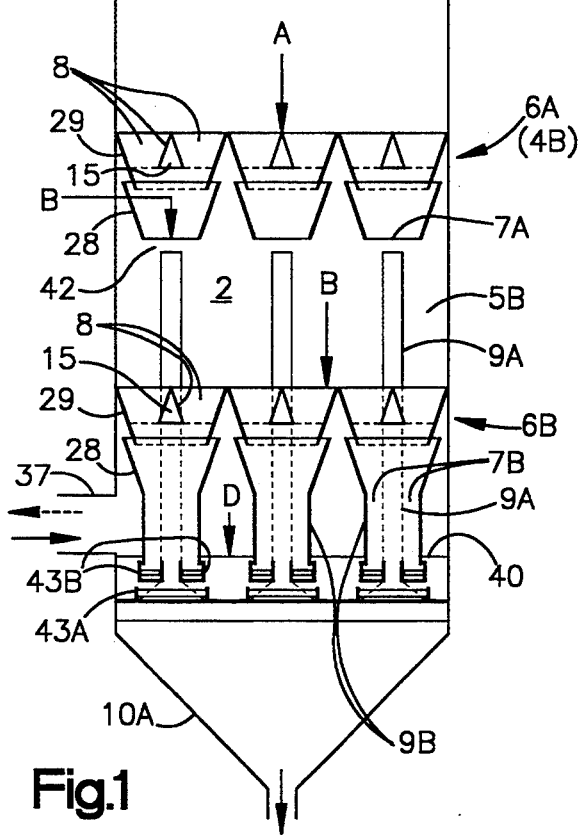

United States Patent [19]
Grochowski

[11] Patent Number: 5,441,704
[45] Date of Patent: Aug. 15, 1995

[54] FLUIDIZED BED REACTOR ARRANGEMENT

[76] Inventor: Horst Grochowski, Hafenstrabe 25, D-4200 Oberhausen, Germany

[21] Appl. No.: 182,667

[22] PCT Filed: May 12, 1990

[86] PCT No.: PCT/EP90/00768

§ 371 Date: Nov. 19, 1991

§ 102(e) Date: Nov. 19, 1991

[87] PCT Pub. No.: WO90/14156

PCT Pub. Date: Nov. 29, 1990

Related U.S. Application Data

[63] Continuation of Ser. No. 776,345, Nov. 19, 1991, abandoned.

[30] Foreign Application Priority Data

May 19, 1989 [DE] Germany .................. 39 16 325.3

[51] Int. Cl.$^6$ .......................... B01J 8/12; B01J 8/28
[52] U.S. Cl. .......................... 422/145; 422/142; 422/219
[58] Field of Search ............ 422/140, 141, 142, 144, 422/145, 170, 176, 177, 178, 211, 212, 213, 216, 219

[56] References Cited

U.S. PATENT DOCUMENTS

| | | | |
|---|---|---|---|
| 2,509,014 | 5/1950 | Payne et al. | 252/410 |
| 2,509,019 | 5/1950 | Simpson et al. | 196/52 |
| 2,519,874 | 8/1950 | Berg | 183/4.2 |
| 2,550,955 | 5/1951 | Berg | 183/4.2 |
| 2,656,007 | 10/1953 | Arnold et al. | 422/207 X |
| 2,891,847 | 6/1959 | Vaell et al. | 23/288 |
| 3,622,441 | 11/1971 | Perkins | 422/114 X |
| 5,000,770 | 3/1991 | Ritter | 55/474 |

FOREIGN PATENT DOCUMENTS

| | | |
|---|---|---|
| 883598 | 3/1954 | Germany . |
| 909567 | 4/1954 | Germany . |
| 3228984 | 11/1983 | Germany . |
| 3523417 | 1/1987 | Germany . |
| 3528222 | 2/1987 | Germany . |
| 8706539 | 6/1987 | Germany . |
| 3732567 | 11/1988 | Germany . |
| 8808746 | 11/1988 | WIPO . |
| 8700768 | 2/1989 | WIPO . |

*Primary Examiner*—Robert J. Warden
*Assistant Examiner*—Robert Carpenter
*Attorney, Agent, or Firm*—Tarolli, Sundheim & Covell

[57] ABSTRACT

A fluidized bed reactor arrangement (1) for the treatment of fluids by means of solid matter that is present in the form of bulk material (2), preferably in a countercurrent process, in which at least one bulk material moves from the top to the bottom and at least one fluid flows from the bottom to the top. The reactor is particularly intended to provide a better flexibility in the bulk material distribution into or in the bulk material discharge from at least two reaction chambers (5A, 5B) arranged on top of each other. Each reaction chamber is provided with a flow-past base (6A, 6B) for the distribution of the fluid over the cross section of the reaction chamber. Each reaction chamber is also provided with a bulk material distribution base (4A, 4B) for the distribution of bulk material over the cross section of the reaction chamber. Means (34,34B) are provided for distributing bulk material to the lower reaction chamber through the upper reaction chamber separately from the bulk material located in the upper reaction chamber, and means (9A) are provided for discharging bulk material from the upper reaction chamber through the lower reaction chamber separately from the bulk material in the lower reaction chamber.

19 Claims, 12 Drawing Sheets

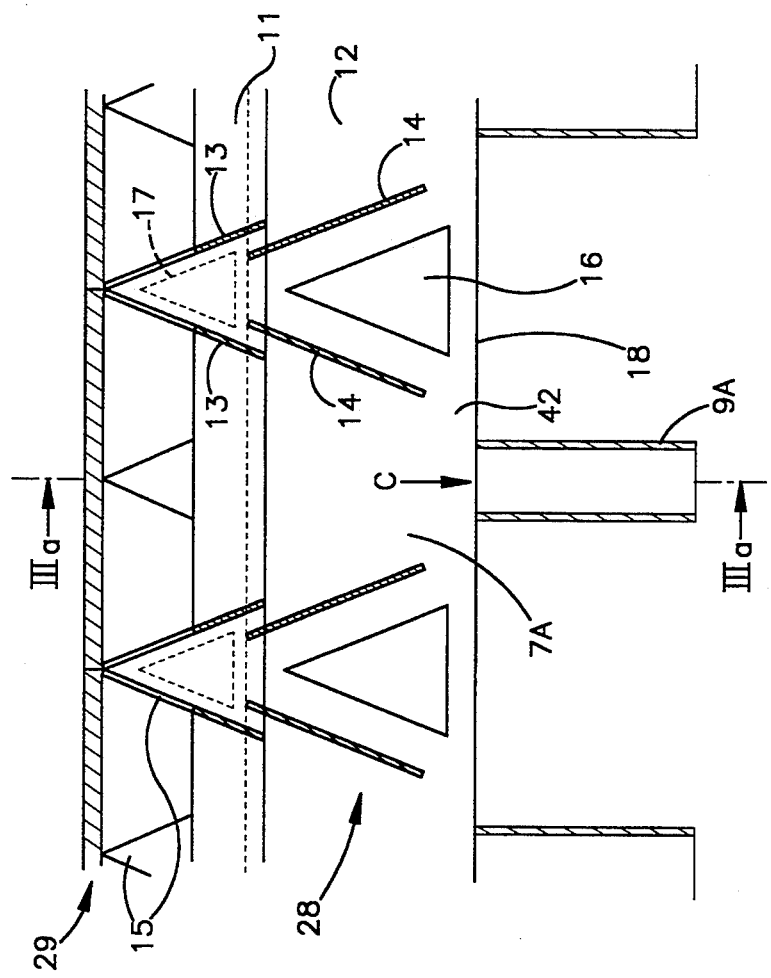
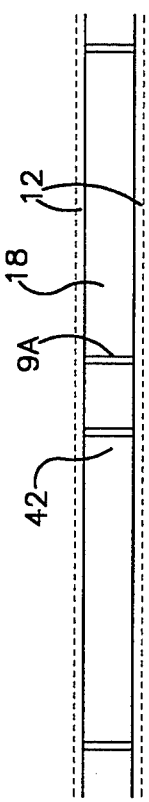
Fig.3B
Fig.3C
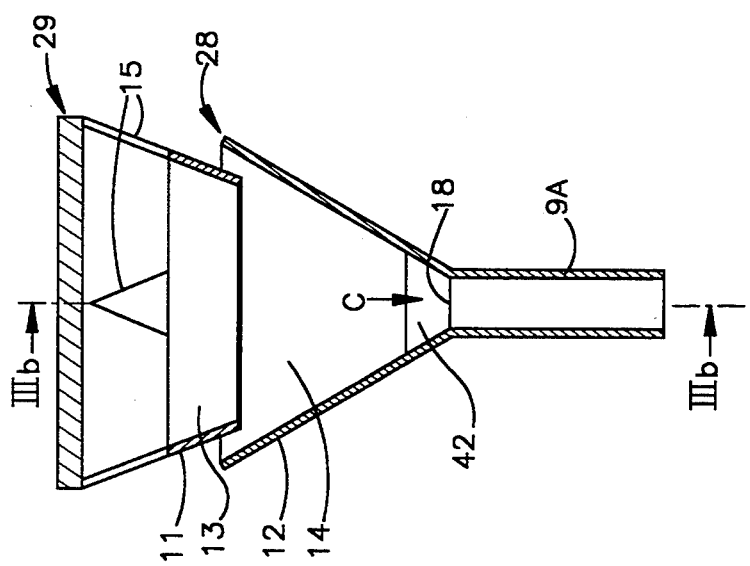
Fig.3A

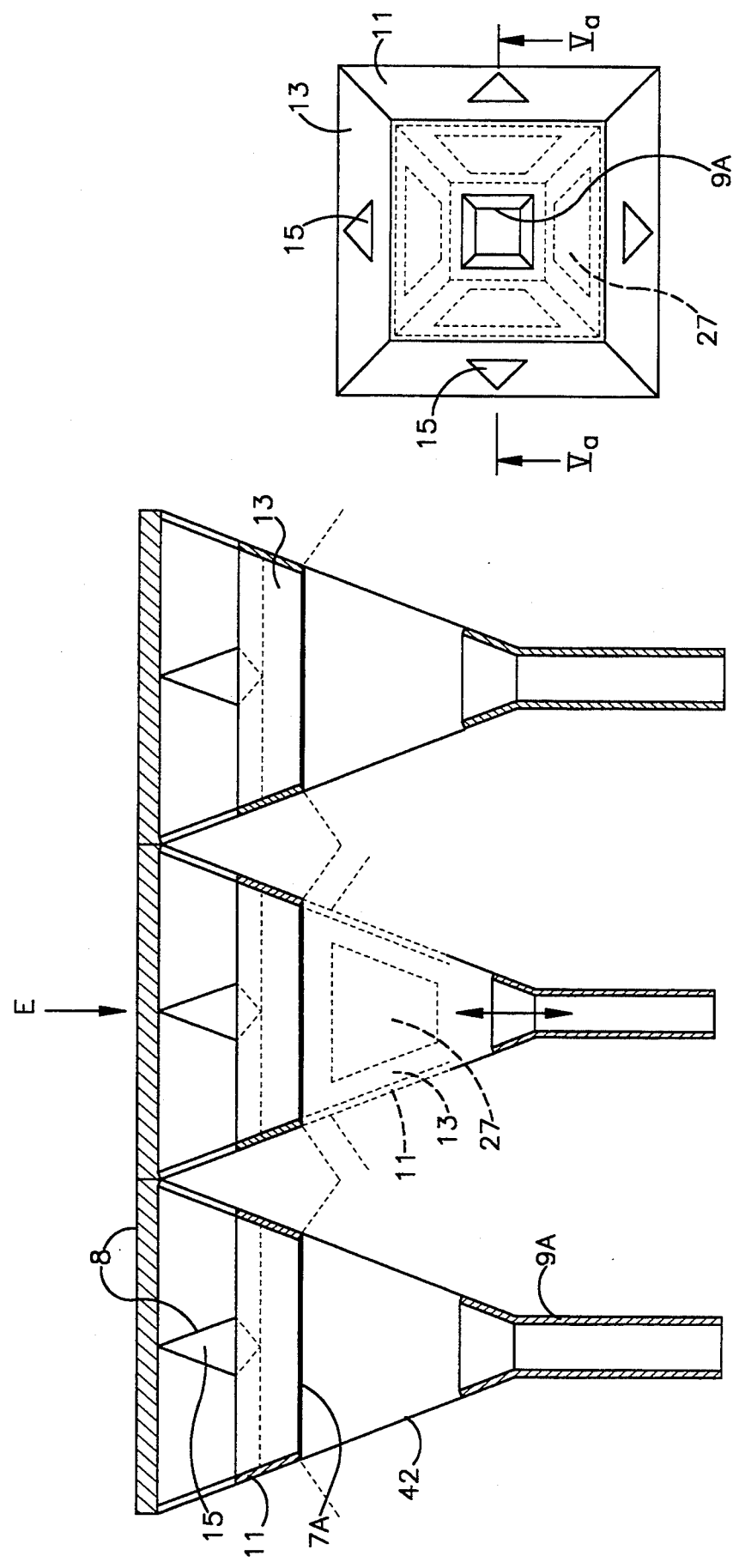

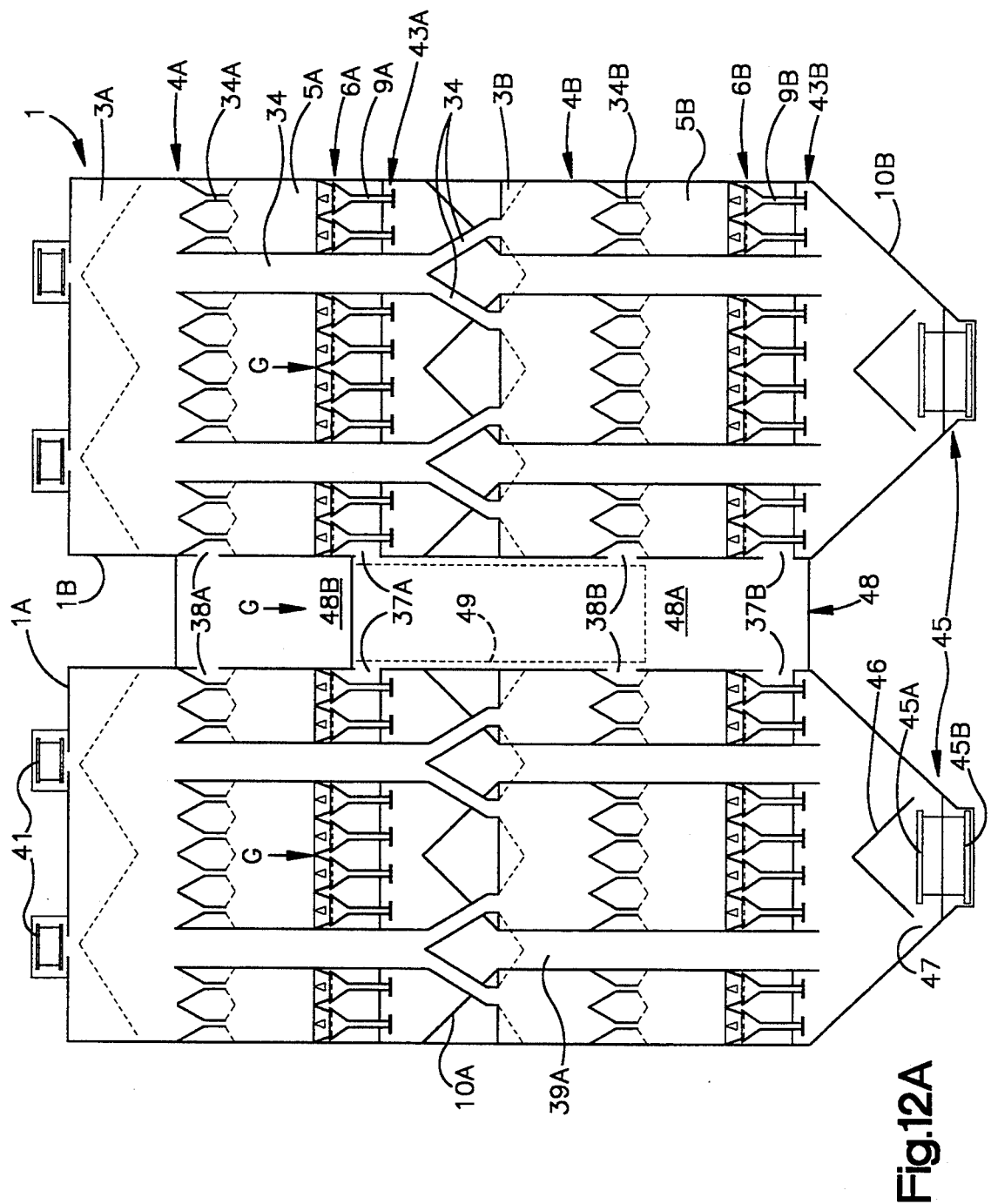

FLUIDIZED BED REACTOR ARRANGEMENT

This is a continuation of application(s) Ser. No. 07/776,345 filed on Nov. 19, 1991, now abandoned, International Application PCT/EP90/00768 filed on May 12, 1990.

This invention concerns a fluidized bed reactor arrangement for the treatment of fluids by means of solid matter that is present in form of bulk material, preferably in a countercurrent process. The reactor comprises an upper reaction chamber, a lower reaction chamber, and a flow-past base for each reaction chamber. The upper reaction chamber comprises one or more bulk material discharge tubes below its flow-past base for the removal of bulk material from at least the upper reaction chamber. One or more bulk material distribution tubes are provided to load at least one reaction chamber with bulk material. The invention primarily concerns such fluidized bed reactors in which bulk material discharge tubes or bulk material discharge shafts, as well as bulk material distribution tubes or bulk material distribution shafts are provided. Such fluidized bed reactor arrangements can be used for cleaning processes of fluids in which one or more fluid components are adsorbed by the bulk material, but can also be used for catalytic reactions and many other processes. According to this definition, the term "treatment" of fluids includes an extensive array of application possibilities.

Fluidized bed reactor arrangements of the initially mentioned kind are known from DE-883 598-C. In this known fluidized bed reactor arrangement, one single bulk material moves successively through all reaction chambers that are arranged on top of each other. For this purpose, a bulk material distribution bin is arranged above the uppermost reaction chamber and a bulk material collector is arranged below the lowermost reaction chamber. Only very special fluid treatments can be executed with these conventional fluidized bed reactor arrangements since practically no flexibility is provided in regard to the bulk material distribution and the bulk material discharge.

Originating from this fact, the invention is based on the objective of improving fluidized bed reactor arrangements of the initially mentioned kind. It is particularly intended to provide more flexibility in the bulk material distribution and the bulk material discharge to and from reaction chambers that are arranged on top of each other.

This objective in regard to an improved flexibility during the bulk material discharge is attained by guiding at least one bulk material discharge tube for the upper reaction chamber through the lower reaction chamber and its flow-past base, and in regard to an improved flexibility during the bulk material distribution is attained by guiding at least one bulk material distribution tube for the lower reaction chamber through the upper reaction chamber and its flow-past base. Both solutions are preferably combined with each other. The invention is thus based on the idea of arranging tubes or shafts within one or more reaction chambers that are arranged on top of each other and guiding the same through at least one flow-past base that is arranged on the upper and/or lower chamber end in such a way that the bulk material is conveyed from a zone above the concerned reaction chamber and through the reaction chamber—separately from the bulk material located within the reaction chamber—into a zone below this reaction chamber.

The invention has the advantage that bulk materials with different volume flows and/or different prehistory and/or different sorts can be conveyed independent from each other through the reaction chambers that are arranged on top of each other. It is also possible to execute equal treatments simultaneously or chronologically offset to each other within the reaction chambers that are arranged on top of each other. The structural height and the weight of the fluidized bed reactor arrangement according to the invention is comparatively low. It is also possible to arrange relatively large flow-past surfaces within a comparatively small space, in particular on a very small base surface. In the same manner, a comparatively very even bulk material distribution or a very even bulk material discharge to and from the individual reaction chambers is possible. In particular, it is possible to convey the bulk material or bulk materials through the individual reaction chambers in a generally plane-parallel manner. The fluid can also be conveyed through the bulk material layers in the single reaction chambers in a very even distribution, in particular with generally equal dwell time.

Preferred examples of the object of the invention, which particularly ensure a very even conveyance of the bulk material particles through the different reaction chambers, as well as a space-saving bulk material distribution or bulk material discharge to and from the fluidized bed reactor arrangement, as well as a flexible applicability for the most different sorts of fluid treatments and reaction conditions in a particularly space-saving manner, are described in the further claims.

The size, form, material selection and technological conception or process conditions of the structural elements and procedural stages according to the invention are not subject to any particular exceptions, so that the selective criteria known for the corresponding application purpose can be applied without limitations; in particular, they can be applied independently from each other to attain the objective of the application or at least part of the objective of the application.

Figure 2:
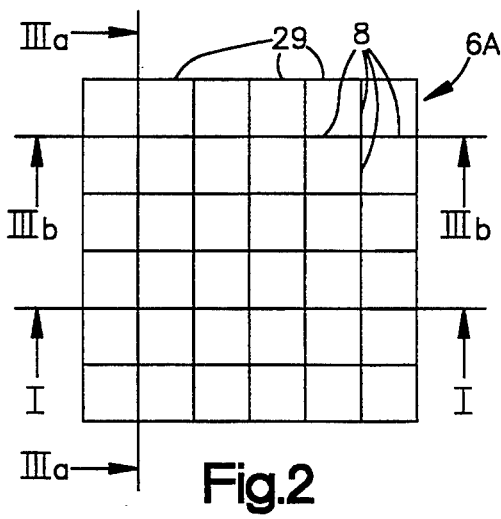
Figure 4A:
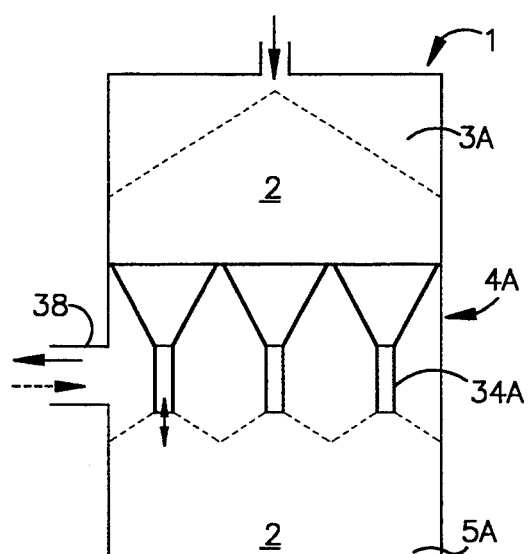
Figure 4B:
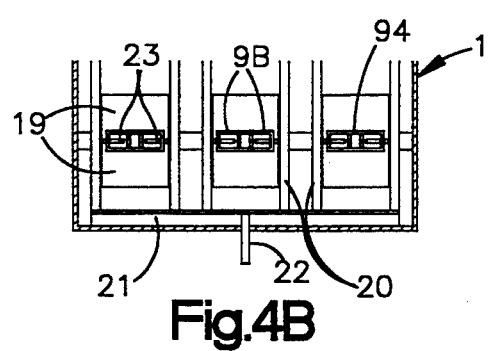
Figure 4C:
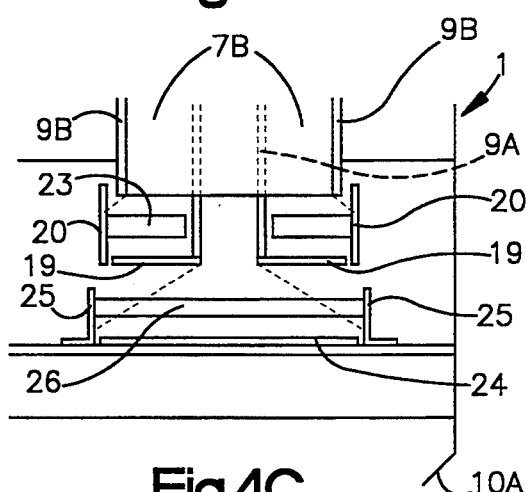
Figure 6A:
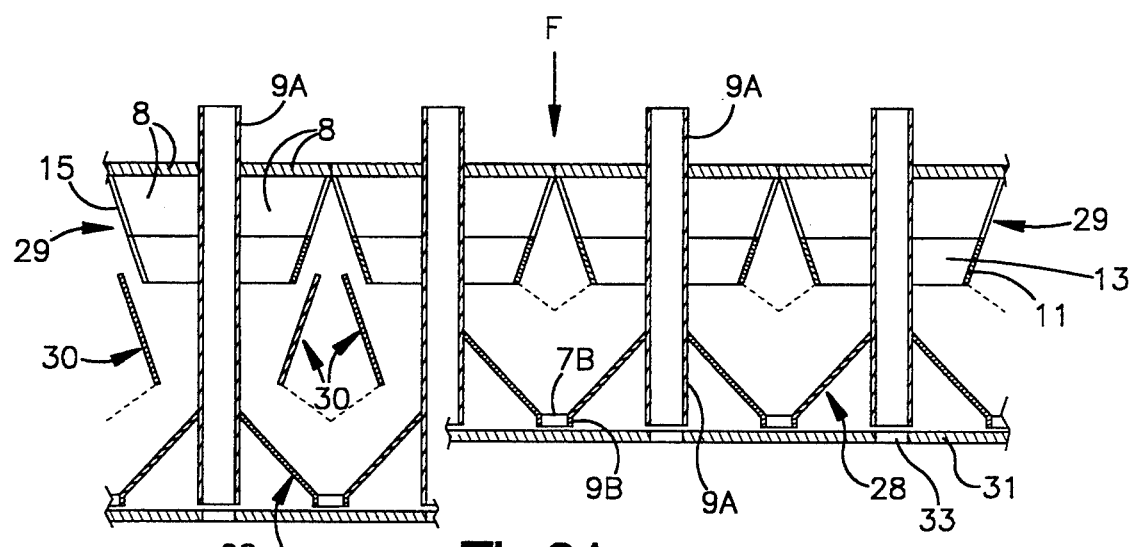
Figure 6B:
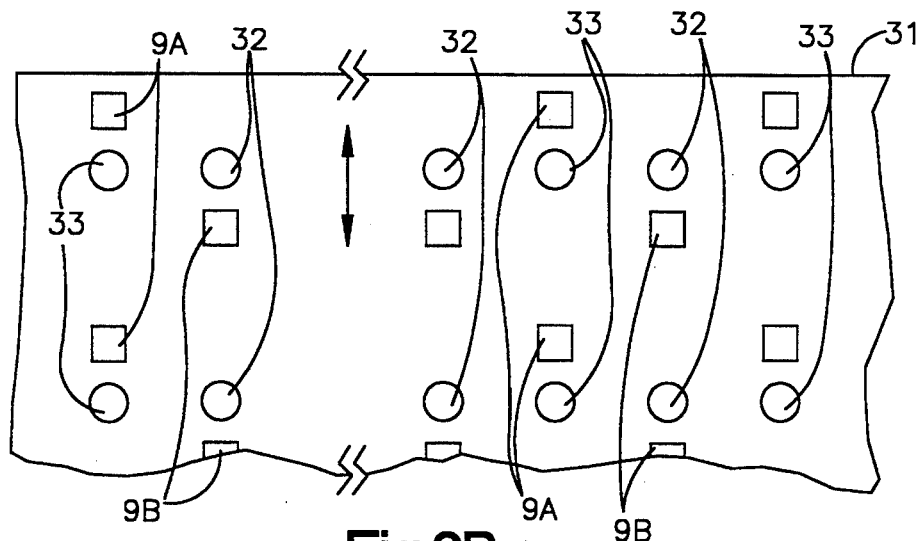
Figure 6C:
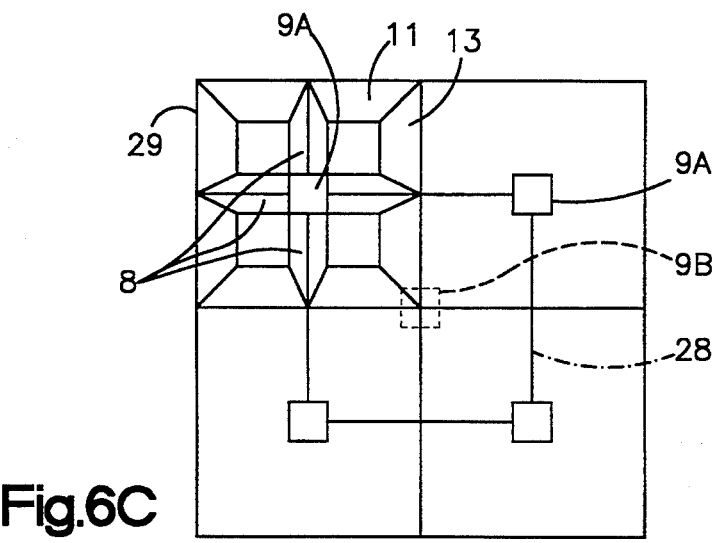
Figures 7A, 7B:
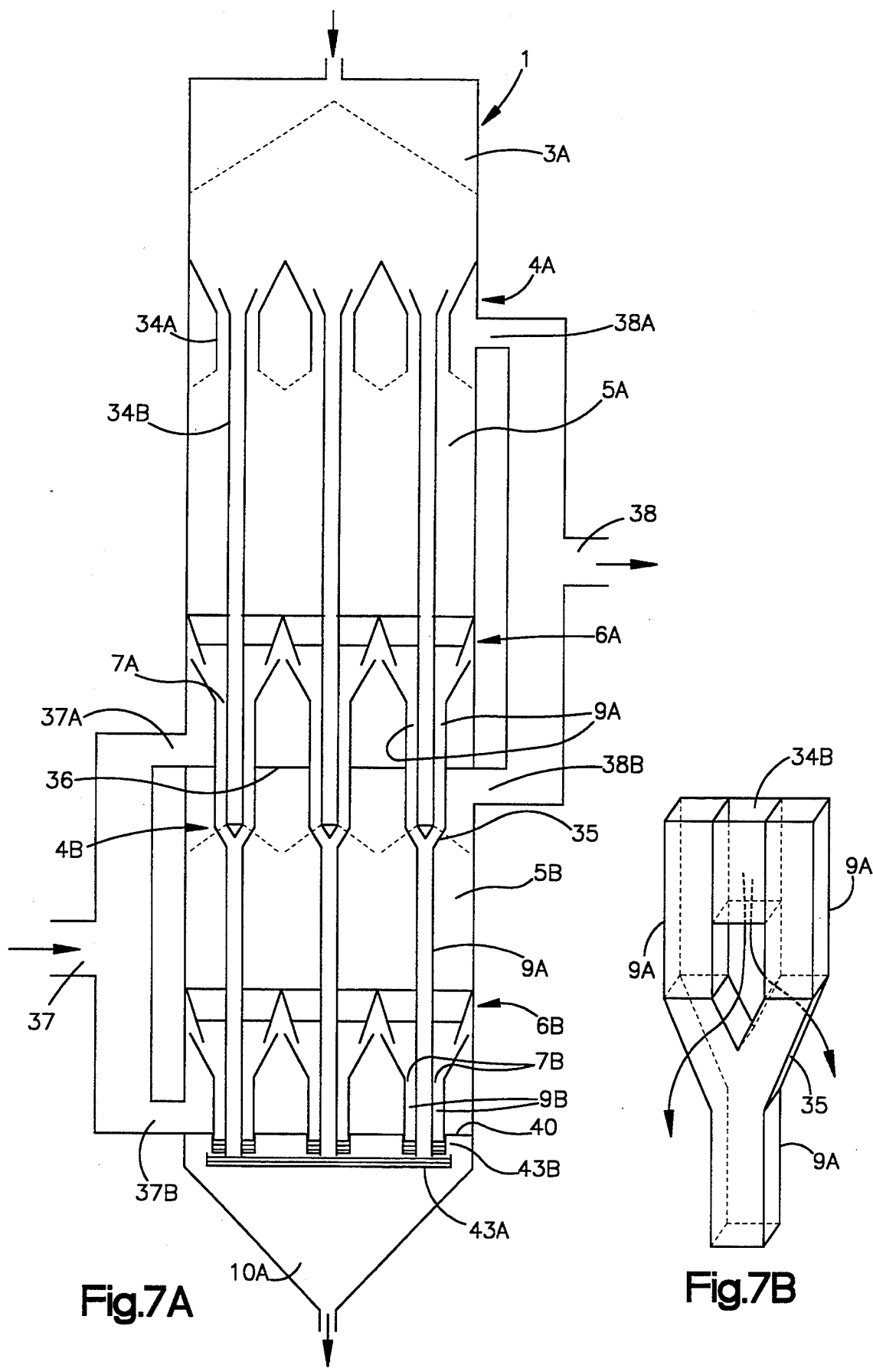
Figure 8:
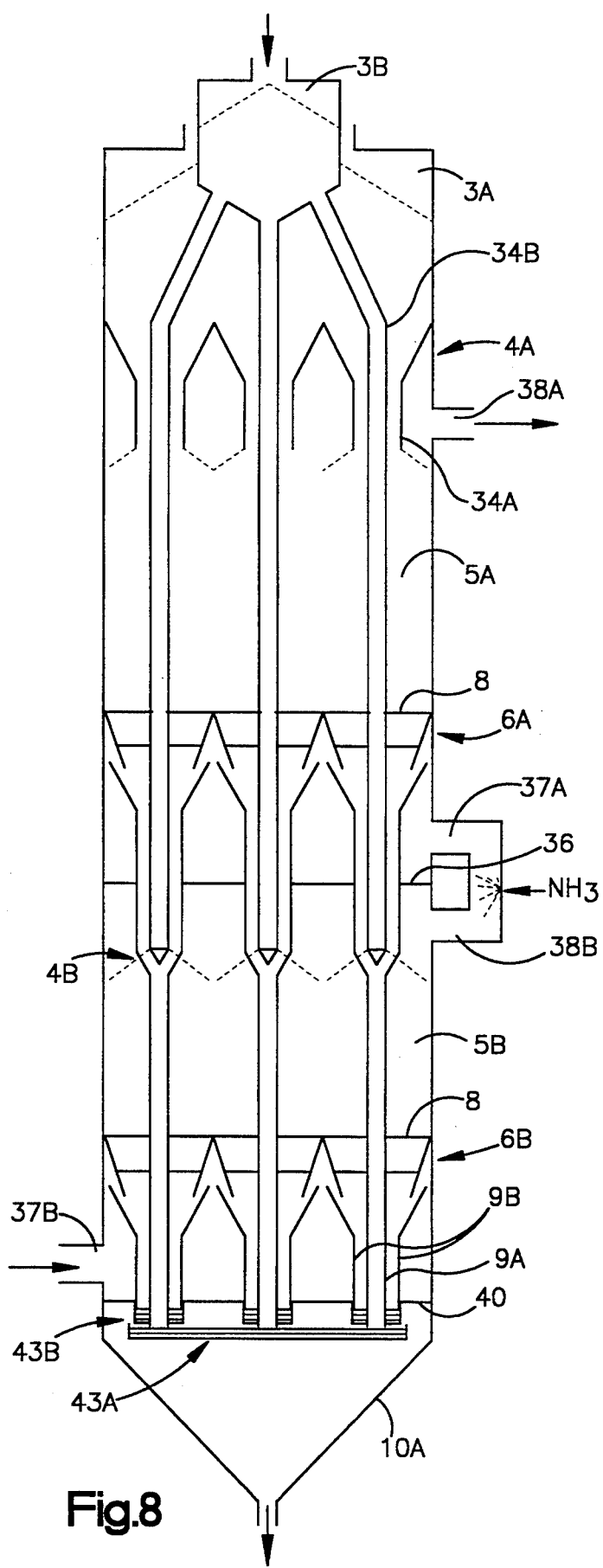
Figure 9A:
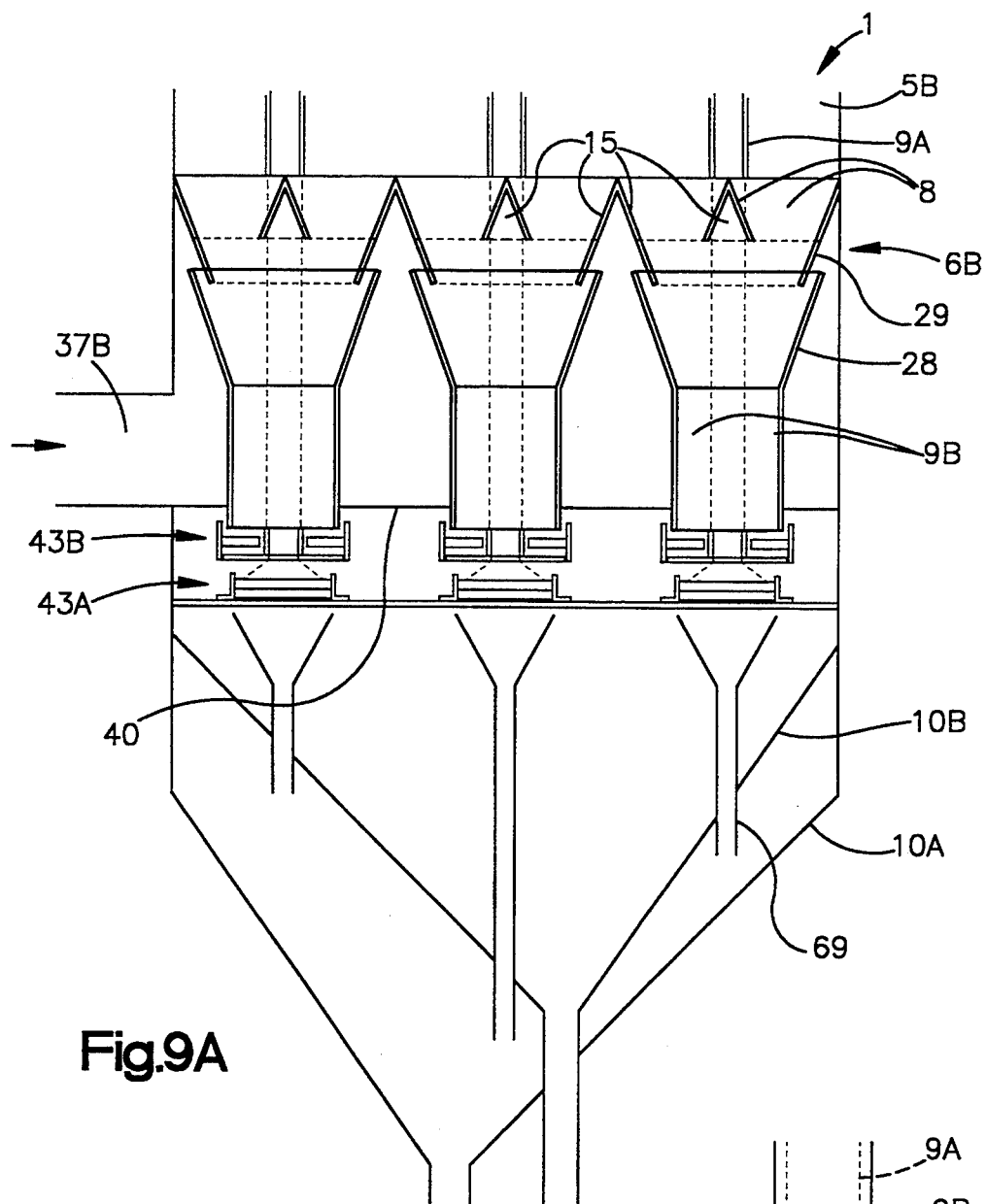
Figure 9B:
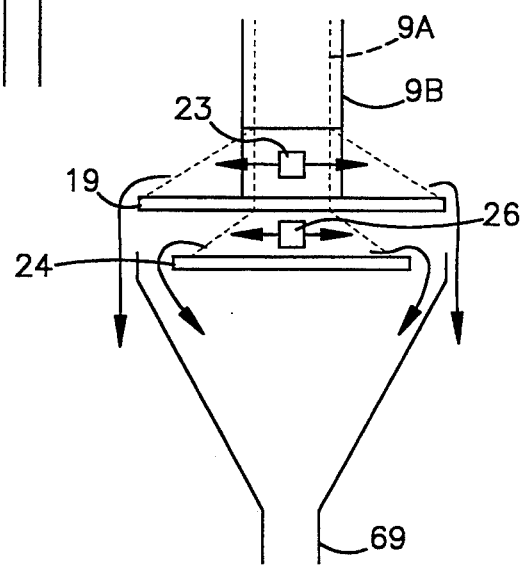
Figure 10:
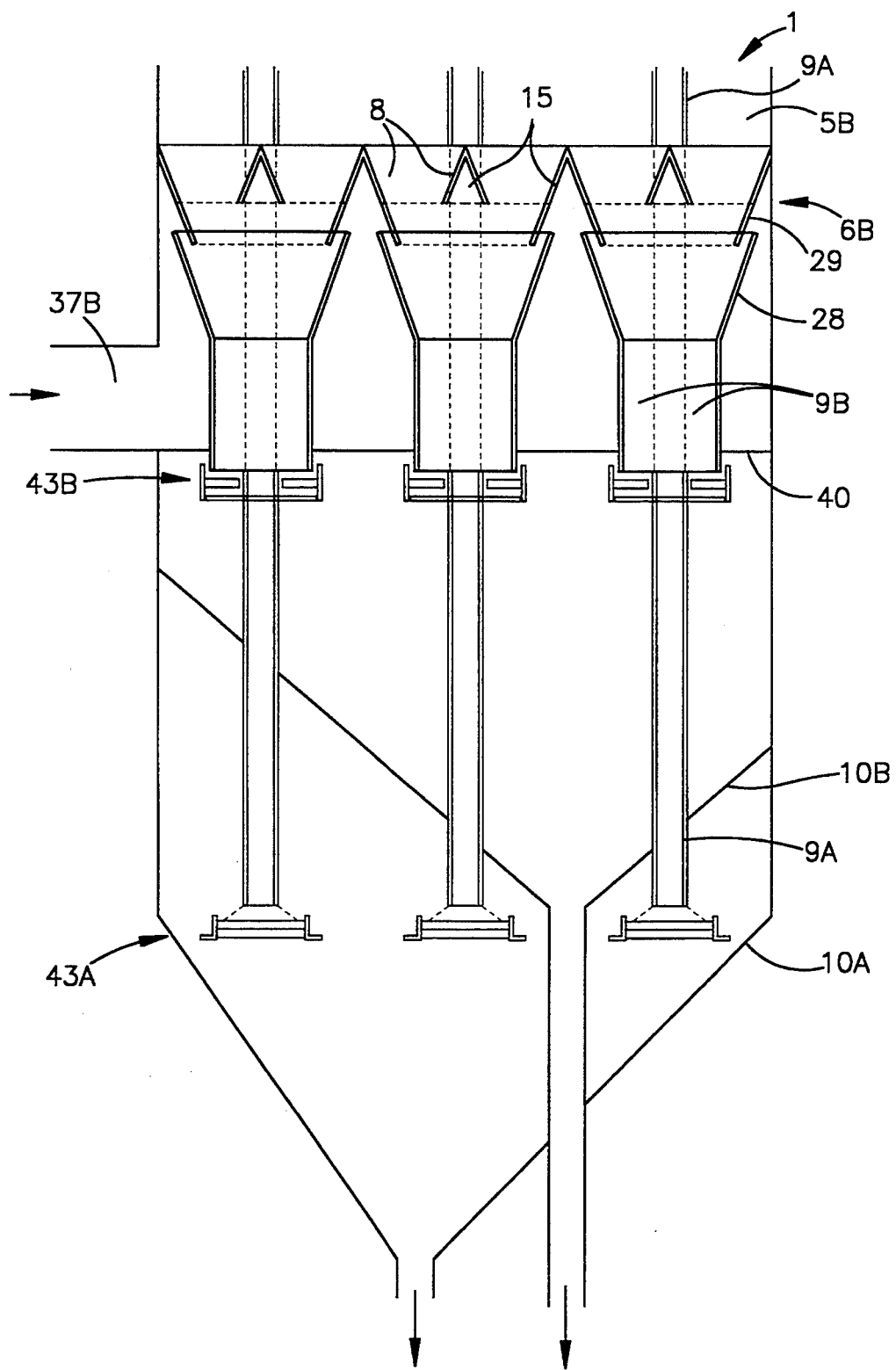
Figure 11:
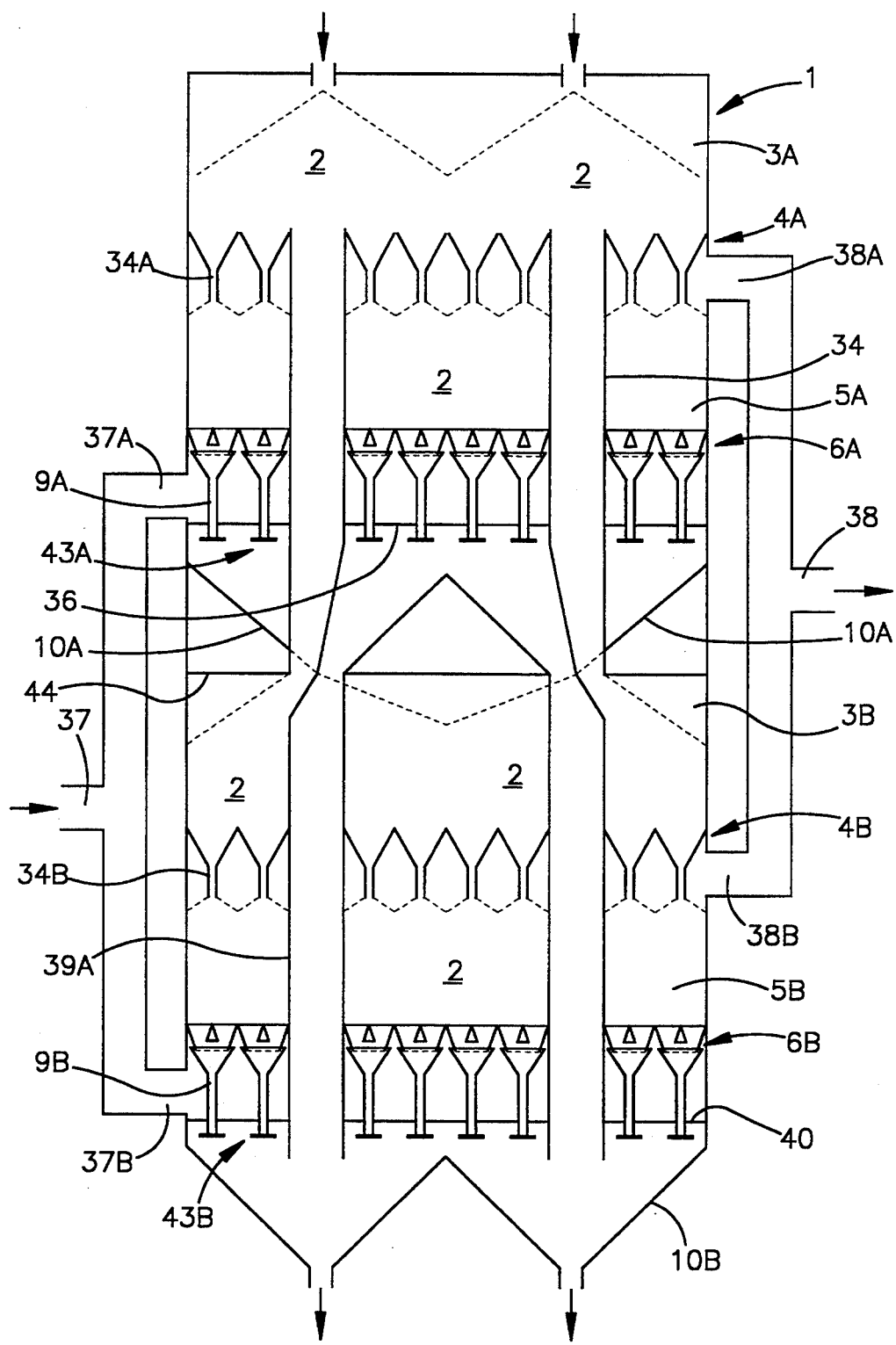
Figure 12B:
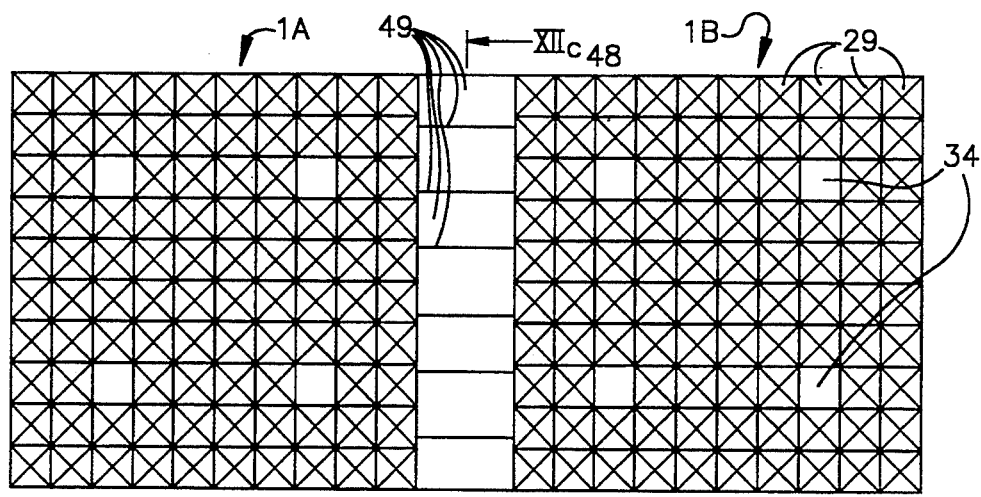
Figure 12C:
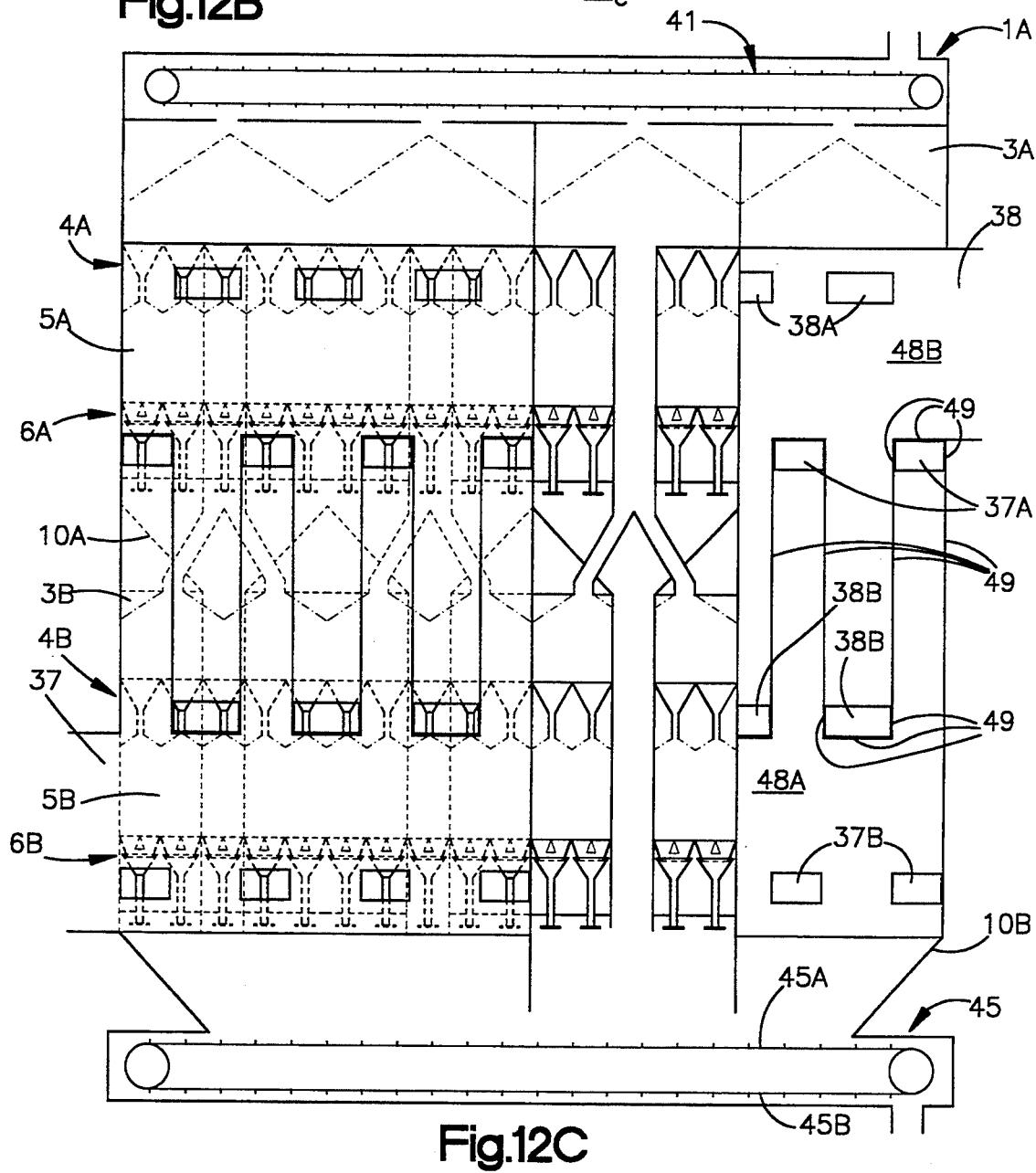
Figure 13A:
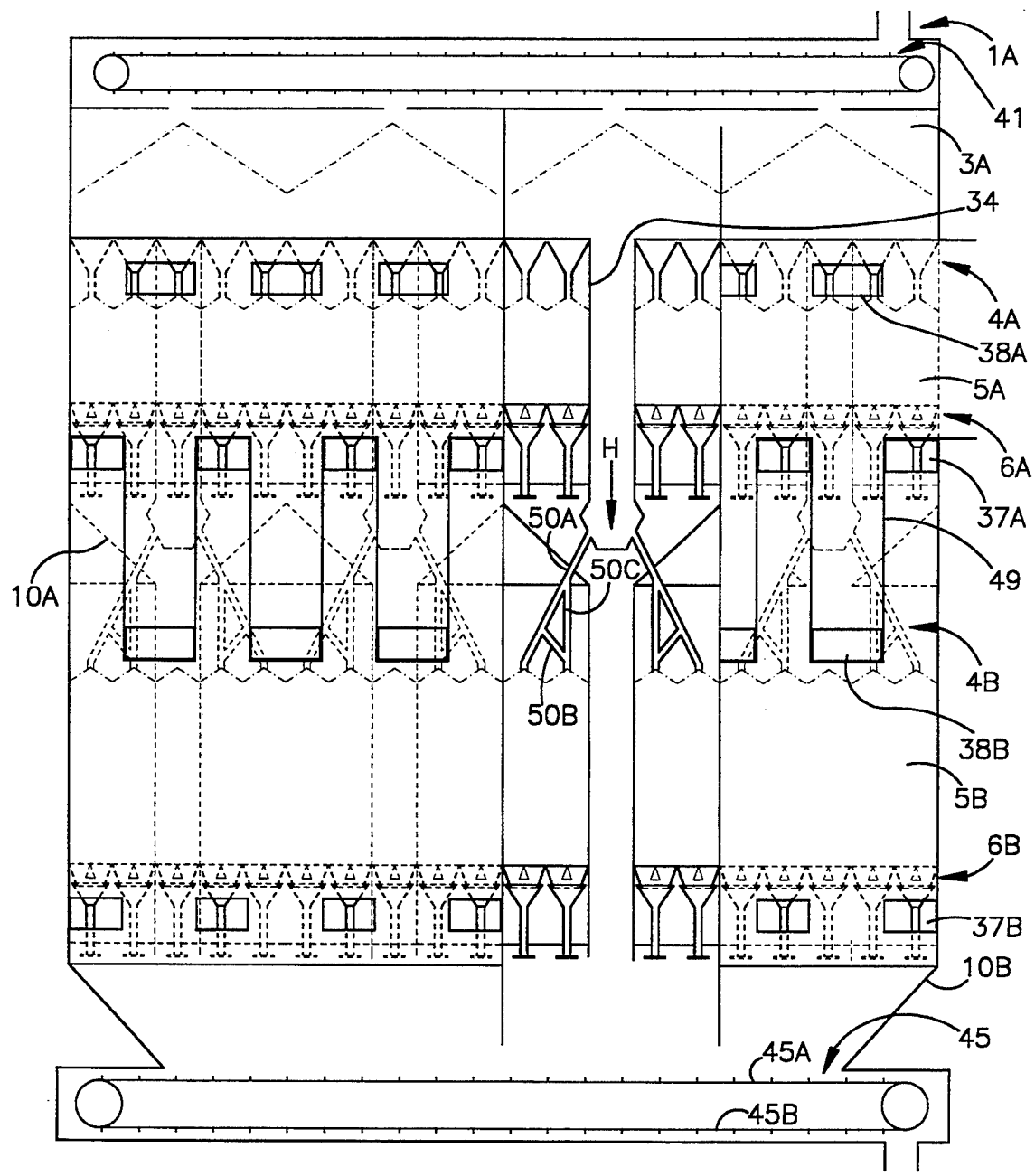
Figure 13B:
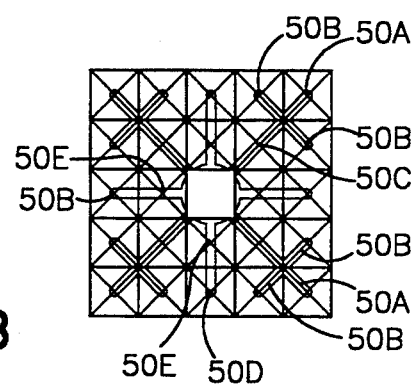

Further details, characteristics and advantages of the object of the invention can be seen in the following description of the corresponding drawing, in which preferred examples of the fluidized bed reactor arrangement according to the invention are illustrated in form of an example. The drawings show:

FIG. 1 a vertical section through a fluidized bed reactor arrangement (first variation) along the line I—I in FIG. 2 in schematic representation;

FIG. 2 a top view of the upper flow-past base (top view A according to FIG. 1) of the same fluidized bed reactor arrangement;

FIG. 3a a vertical section of the same fluidized bed reactor arrangement through a single module of the upper flow-past base along the line IIIa—IIIa according to FIG. 2;

FIG. 3b a further vertical section of the same fluidized bed reactor through the upper flow-past base along the line IIIb—IIIb according to FIG. 2;

FIG. 3c a top view of a lower groove of the upper flow-past base (top view C according to FIG. 3a/b) of the same fluidized bed reactor;

FIG. 4a a top view of the lower flow-past base (top view B according to FIG. 1) of the same fluidized bed reactor;

FIG. 4b a top view of the bulk material discharge devices (top view D according to FIG. 1) of the same fluidized bed reactor;

FIG. 4c a detail of the same discharge device, however in enlarged representation as compared to FIG. 1;

FIG. 5a a vertical section of a further flow-past base (corresponding to FIG. 3a)—in sectional representation and in two alternative variations;

FIG. 5b a top view of the central module, however without flow-past cross (top view E according to FIG. 5a), of the same flow-past base;

FIG. 6a a vertical section (corresponding to the illustration in FIG. 3a) of a further flow-past base in two alterative variations;

FIG. 6b a top view (corresponding to top view F according to FIG. 6a) of the bulk material discharge device of the same flow-past base;

FIG. 6c a top view (top view F according to FIG. 6a) of the same flow-past base;

FIG. 7a a vertical section (corresponding to the manner of illustration in FIG. 1) through a further fluidized bed reactor arrangement (second variation);

FIG. 7b a perspective detail of the bulk material distribution and discharge below the upper flow-past base of the same fluidized bed reactor arrangement;

FIG. 8 a further fluidized bed reactor arrangement (third variation) in the same manner of illustration as in FIG. 1;

FIG. 9a a vertical section of a double bulk material collection funnel corresponding to the manner of illustration in FIG. 1;

FIG. 9b an enlarged side view (turned by 90 degrees as compared to FIG. 9a) of a further bulk material discharge device of the same bulk material collection funnel;

FIG. 10 a further double bulk material collection funnel corresponding to the manner of illustration in FIG. 9a;

FIG. 11 a further fluidized bed reactor arrangement (fourth variation) in the same manner of representation as in FIG. 1;

FIG. 12a further fluidized be reactor arrangement (fifth variation) in the same manner of representation as in FIG. 1 as an alternative to the fourth variation;

FIG. 12b a top view (top view G) of the upper flow-past base of the same fluidized bed reactor arrangement;

FIG. 12c a vertical section of the same fluidized bed reactor arrangement along the line XIIc—XIIc;

FIG. 13a further fluidized bed reactor arrangement (sixth variation) in the same manner of representation as in FIG. 12c as an alternative to the fifth variation, and FIG. 13b a top view of the upper bulk material distribution base (top view H) of the same fluidized bed reactor arrangement according to FIG. 13a.

FIG. 1 shows a fluidized bed reactor arrangement (1) that serves for the treatment of arbitrary, preferably gaseous fluids and is operated with one single bulk material (2) in a countercurrent process. With all the fluidized bed reactor arrangements described in the following, it is of course also possible to operate in a concurrent, in which only the flow direction of the fluid is changed to the opposite direction.

The bulk material (2) reaches the first (upper) reaction chamber (5A) through a supply bin (3A) with a bulk material distribution base (4A) and, if necessary, bulk material distribution tubes (34A) which can be adjustable in height (as indicated by the double arrow) in order to obtain different bed heights. A flow-past base (6A) is arranged at the lower end of the reaction chamber (5A). This flow-past base has a multiple function: first, it serves to the purpose of evenly distributing the fluid to be treated in the reaction chamber (5A) over the base surface of the reaction chamber (5A); this means that the fluid is introduced into the reaction chamber (5A) through the flow-past base, if—as preferred—the fluidized bed reactor arrangement is operated in a countercurrent process. Second, the flow-past base (6A) serves for the discharge of the bulk material from the reaction chamber (5A) towards the bottom. Third, the flow-past base (6A) serves as bulk material distribution base (4B) in order to distribute the bulk material over the cross section of the reaction chamber (5B) arranged below. The flow-past base (6A), as well as the later described flow-past base (6B) (which is arranged below) are preferably constructed in the same manner as was described in WO88/08746 by the applicant; this means that it is formed by at least one, preferably several funnel or groove-shaped elements (28 and/or 29) that are arranged next to or behind each other in a modular arrangement, in which these elements are provided with one or more bulk material throughput openings (7A) each that are arranged within a distance to each other. In order to provide a better overview, only funnel-shaped elements (double funnel 28,29) are illustrated in FIG. 1, while funnels that are compiled to form grooves, as they will be described later in connection with FIG. 3a to 3c, are preferred.

Independent from the fact if single funnels (29) or two funnels (28 and 29) (double funnel) that are arranged on top of each other are used, the corresponding upper (or single) funnel (29) of a module is provided with roof-shaped distribution elements (8) whose construction details result from WO88/08746 (see also FIG. 6c).

The bulk material reaches the lower reaction chamber (5b), as well as the bulk material discharge tubes (9A) which are arranged below the bulk material throughput openings (7A) within a distance and concentrically to the same, through the bulk material throughput openings (7A) of the flow-past base (6A). The bulk material discharge tubes (9A) are guided generally vertical towards the bottom through the reaction chamber (5B) and the assigned flow-past base (6B). In this manner, the bulk material discharged from the upper flow-past base (6A) towards the bottom can reach the upwardly open bulk material discharge tubes (9A) and can be discharged continuously or periodically at their lower end; these processes will be described later in the text.

The (lower) flow-past base (6B) is generally constructed in the same manner as the (upper) flow-past base (6A), in which the equally large funnel modules are arranged vertically flush below the modules of the (upper) flow-past base (6A) arranged above. The (lower) flow-past base (6B) has the functions of evenly distributing the fluid introduced into the fluidized bed reactor arrangement from below over the cross section of the (lower) reaction chamber (5B) and of allowing the bulk material to flow towards the bottom from the reaction chamber (5B) through bulk material throughput openings (7B).

The funnels or grooves of the flow-past bases of the reaction chambers that are arranged on top of each other can also be offset to each other by a gap, for example in order to obtain a bed height in the lower reaction chamber that is adapted to the reaction chamber cross section. This fact is not separately illustrated in the drawings since it is already known from W087/00768 held by the applicant.

The fluid, which leaves the reaction chamber (5B) through the bulk material cones illustrated by the dotted line, as well as the bulk material throughput openings (7A), thus successively flows through both reaction chambers (5B and 5A) in a serial connection.

A bulk material collection funnel (10A) is located at the lower end of the fluidized bed reactor arrangement (1), in which the bulk material can be discharged from both reaction chambers of the fluidized bed reactor arrangement on the lower end of the bulk material collection funnel. For this purpose, the bulk materials from both reaction chambers can be collected together in the bulk material collection funnel (10A). It will usually be desired to separately discharge the bulk materials from the two reaction chambers that are arranged on top of each other. In this case, it is necessary to provide bulk material discharge devices (43A and 43B) that can be activated independently from each other below the (lower) flow-past base (6B). This will be described in more detail later in the text.

The example according to FIG. 1 is amongst other application purposes very suitable for adsorption processes of undesired components from the exhaust gases of waste incineration facilities, in which, for example, heavy metals, in particular mercury on one hand and, for example, sulphur oxide or nitrogen oxide on the other hand are removed. The heavy metal adsorption is executed in the lower reaction chamber, while undesired gas components are entirely or partially removed form the thus pretreated exhaust gas in the upper reaction chamber. An adsorption agent that was precharged with the mentioned gaseous components is continuously introduced in the lower reaction chamber, while fresh or regenerated bulk material is introduced into the upper reaction chamber. It was established that the precharged bulk material in the upper reaction chamber is particularly suitable for the adsorption processes in the lower reaction chamber—as it was previously described in form of an example. The possibility of a separate bulk material discharge from both reaction chambers that are arranged on top of each other allows the realization of very different dwell times or conveyance speeds of the bulk materials in the two reaction chambers. Since the discharge cycles for bulk material in the two reaction chambers usually differ from each other, the two differently charged bulk materials can also be collected separately from each other and discharged separately from the collection funnel (10A).

FIG. 2 shows the horizontal projection of the (upper) flow-past base (6A) in form of a top view. In the example shown, it consists of nine funnel modules that are arranged tightly next to or behind each other and are illustrated by continuous lines. Each funnel module is provided with crosswise arranged roof-shaped distribution elements (8) of which only the dot-dashed ridges of the roofs are illustrated in order to create a better overview.

FIGS. 3a to 3c illustrate an alternative variation for the flow-past bases as compared to the illustration in FIG. 1. This variation particularly concerns the (upper) flow-past base (6A), however, the same basic idea of a combination of the funnel elements in a series to form a groove can also be applied to other flow past bases. Each groove according to FIGS. 3a to 3c shows parallel extending sidewalls (11) for the upper funnel (29) and (12) for the lower funnel (28), in which the sidewalls extend in a slightly conical manner towards the bottom. Sidewalls (13 and 14) that extend in pairs transverse to the direction of the groove towards the bottom are arranged within each groove, so that square funnels are created. This arrangement is comparatively resistant to bending and usually able to intercept the compression forces of the bulk material located on the flow-past base without additional reinforcement elements, so that a self-supporting flow-past base is created.

The upper funnels (29) formed by the sidewalls (11 and 12) are in turn provided with the above described roof-shaped, crosswise arranged distribution elements (8). At the location where these distribution elements connect to the sidewalls (11 and 13), they cover the triangular fluid throughput openings (15) that are arranged in the sidewalls (11 and 13). Further fluid throughput openings (16 or 17) can be provided in the gore surfaces between adjacent funnels of a groove in order to reduce the resistance for the fluid; this can also be obtained by insertion of tube-shaped intermediate pieces, as provided below the lower flow-past base in FIG. 1.

For the purpose of an upper flow-past base, the lower gap (18) between the sidewalls (12) of the lower groove can remain completely open. A bulk material distribution tube (9A) for the reaction chamber arranged above is mounted on the sidewalls (12) only in the central area below each double funnel module. The exact height of the upper opening of the bulk material discharge tube (9A) can basically be chosen arbitrarily—as will be described later in the text.

FIG. 4a shows the top view B of the (lower) flow-past base (6B) that corresponds with FIG. 2. The two FIG. 4a and 2 only differ by the fact that, according to FIG. 4a, the bulk material discharge tubes (9A) are guided through the intersection point of the distribution elements (8) of each funnel module, in which the preferably square cross section of the tubes (9A) is equally large as the surface covered by the distribution elements (8) in their intersection area and preferably has the same cross section as the other distribution and discharge tubes for bulk material to and from the reaction chambers.

FIG. 4b shows that the lower funnel modules (28) of the (lower) flow-past base (6B) do not have a square opening cross section, but a rectangular opening cross section which is approximately three times as large as the cross section of the bulk material discharge tubes (9A). This is the reason that two bulk material throughput openings (7B) that have an approximately equally large cross section can be provided to the right and the left of the bulk material discharge tubes (9A). In this particular example, the bulk material discharge tube (9A) opens somewhat lower than the bulk material throughput openings (7B).

FIG. 4c shows that baffle plates (19) are arranged below the two bulk material throughput openings of each (lower) funnel (or groove). The gap that remains laterally between these baffle plates (19) and the right and left limitations of the openings of the bulk material discharge tubes (9B) is closed by the vertical baffle plates (20). While the baffle plates (19) are only assigned to the single bulk material throughput openings (7B), the baffle plates (20) can be combined (see FIG. 4b) to a series of funnel or groove modules in form of flat steel bars that are arranged behind each other. It is thus possible to connect all baffle plates (20) with each other by a transverse brace (21) and to move the same back and forth by means of a push/pull element (22). A slider (23) which is generally constructed in the shape of a finger is assigned to each bulk material throughput opening (7B) and attached to the baffle plates (20) in an approximately horizontal extent. If the slider (23) is moved back and forth below the bulk material throughput openings (7B) by the push/pull element (22), the transverse brace (21) and the baffle plates (20), the bulk material can be discharged from the baffle plates (19) towards the front or the rear. This manner of operation makes is possible to discharge well measured quantities of bulk material from the lower reaction chamber (5B). In a similar manner, it is possible to construct the bulk material discharge device (43A) for the bulk material discharge tubes (9A) which are equipped with baffle plates (24 and 25) and the bar-shaped slider (26) that is arranged between the baffle plates (25). The bulk material cones that result during the stand still of the two bulk material discharge devices are (just like in the other figures) illustrated by dotted lines.

It would also be possible to construct the bulk material discharge devices for the bulk material throughput openings (7B) in such a way that they are assigned together as pairs to the closest bulk material throughput openings of adjacent (and not the same) funnel or groove.

The previously described discharge device thus makes it possible to discharge only a small portion of the bulk material located within the concerned reaction chamber. The special construction of the previously described flow-past base thus makes it possible to discharge a generally plane-parallel layer of bulk material from the lower end of the bulk material layer from the concerned reaction chamber. It is also possible to discharge only that particular bulk material layer that is no longer suitable for the continued treatment of the fluid, for example because its adsorption capacity has been exhausted. The higher bulk material layers in the concerned reaction chambers are—if a countercurrent process is applied—in most cases suitable for continued treatment of fluids. In particular, the charging level of the bulk material decreases from the bottom towards the top in adsorption processes within the reaction chamber.

However, should it be desired to exchange the entire bulk material from a reaction chamber, this can be easily obtained by corresponding bulk material discharge devices as they will be described later in the text, for example in connection with FIGS. 6a/b. In both instances, the discharge of bulk material from a reaction chamber causes the fresh bulk material from higher supply bins to slide towards the bottom. This sliding movement automatically ceases as soon as the tip of the thus formed bulk material cone reaches the bulk material intake opening arranged above.

FIGS. 5a/b show a further alternative variation of a flow-past base according to the invention. In this variation, the funnels or grooves illustrated in FIGS. 3a/b were omitted. This form of construction can be particularly applied as an upper flow-past base in connection with fluidized bed reactors according to FIG. 1. The dotted upper limitation lines of the bulk material show that the bulk material layer extends into the reaction chamber located below this flow-past base up to the lower edges of the funnel. This makes it possible to obtain smaller structural heights as compared to the variation according to FIG. 1. In any case, the weight and the effort for the lower funnels or grooves are reduced. FIG. 5a furthermore shows a special arrangement of the bulk material discharge tubes (9A) in regard to the flow-past base arranged above. First, the upper opening of the bulk material discharge tubes (9A) expands in its cross section towards the top, in particular in the shape of a funnel. Furthermore, the bulk material intake opening of the bulk material discharge tubes (9) is arranged in such a way that it lies on a circumference line of a fictitious linear extension (illustrated by broken lines) of the funnel or groove sidewalls (11 and 13). Each of these two measures improves the bulk material discharge behavior through the bulk material discharge tubes (9A). However, it must be considered that the bulk material discharged through the bulk material discharge tubes (9A) in this manner has been in contact with that particular fluid that has passed through the bulk material layers of the bulk material discharge tube (9A). This does not necessarily represent a disadvantage, if a corresponding bed height is adjusted in the concerned reaction chamber. If the bed height is sufficiently high or if the bulk material has been discharged from this reaction chamber early enough, the fluid treatment in this particular reaction chamber has already been concluded when the fluid flow has reached the level of the bulk material intake openings—which usually end at the same level—of the bulk material discharge tubes (9A). In these instances, the reduction of the structural height is less important than the weight and effort reduction for the lower funnel, which primarily have the function of discharging the bulk material through a relatively small bulk material throughput opening from a higher reaction chamber.

FIG. 5a furthermore shows an example of the central module that can be constructed in such a way that the bulk material intake end of the bulk material discharge tubes (9A) can be adjustable in its height. This leads to the fact that changing process conditions during the fluid treatment can be taken into account. This height adjustability also changes the effective bed height in the reaction chamber through which these bulk material discharge tubes are guided.

FIG. 5a furthermore shows an alternative variation of the flow-past base with the example of the central module. The sidewalls (11 and 13) lead further downward than with the remaining modules (illustrated by broken lines). Perforations (27) through which the bulk material can be laterally discharged from the concerned funnel at a relatively high point in order to supply the reaction chamber located below the flow-past base with bulk material are distributed over the circumference of these extensions of the sidewalls towards the bottom. In this particular instance, it is even possible to connect the bulk material discharge tubes (9A) directly to the lower openings of the funnels (not illustrated separately). Such perforations in the sidewalls, or at least partial extensions of the sidewalls of the funnels towards the bottom, do not only lead to the fact that part of the bulk material that has passed through the flow-past base can already be introduced into the lower reaction chamber at a relatively high point, but also leads to the fact that part of the bulk material to be discharged through the bulk material discharge tubes can be discharged particularly easy at the bottom.

FIG. 5b provides a top view into the central module of the flow-past base according to FIG. 5a, in which the roof-shaped distribution elements were omitted to provide a better overview. It is of course also possible to construct this flow-past base in the shape of a groove, which means in the same manner as illustrated in the example according to FIGS. 3a/b. Furthermore, it is also obvious that the perforations (27) can also be constructed as edge recesses in the lower edge of the funnel.

FIG. 6a shows an alternative arrangement of a flow-past base as compared to FIG. 1, in which the "basic principle" of an arrangement that is offset by a gap between the upper and lower funnels (double funnel) of a flow-past base is basically suitable for all flow past bases of a fluidized bed reactor arrangement. The concrete example shown is particularly designed for the lowermost flow-past base. The upper funnel or grooves (29) of the flow-past base are constructed in the same manner as the (lower) flow-past base (6B) according to FIG. 1, which means that the funnel or grooves are provided with crosswise arranged roof-shaped distribution elements (8) (see FIG. 6c) and fluid throughput openings (15) in the sidewalls (11 and 13) immediately below the roof-shaped distribution elements (8). Furthermore, each upper funnel (29) is penetrated by a bulk material discharge tube (9A) from a higher reaction chamber in the area of the intersection of the roof-shaped distribution elements (8). For this reason and because of the arrangement with a gap between the upper funnels or grooves (29) and the lower funnels or grooves (28), this leads to the fact that the bulk material throughput openings (7B) for the (lower) flow-past base (shown) open in such a way that they are offset by a gap against the lower openings of the bulk material discharge tubes (9A), in particular in the same level with the same. This arrangement, which is offset by a gap, can be clearly seen in FIGS. 6b and 6c.

The left half of FIG. 6a shows that additional intermediate funnels or grooves (30) can be provided which are arranged and constructed similar to the double funnels illustrated in FIG. 1. These intermediate funnels improve the evenness of the fluid distribution below the flow-past base.

This funnel or groove arrangement that is offset by a gap allows the realization of particularly simple bulk material discharge devices, for example in form of a single slider plate (31) which can be moved in the direction of the double arrow shown in FIG. 6b below all bulk material discharge openings. For this purpose, the slider plate (31) is provided with throughput openings (32 and 33), which, depending on their position, selectively extend flush with the bulk material discharge tubes (9A) (just as in FIG. 6a) or (9B) or with none of the bulk material tubes.

FIG. 6b shows the slider plate (31) in the closing position for all bulk material openings. The throughput openings (32) can be brought in such a position that they cover the bulk material throughput openings (7B) by movement of the slider plate (31) towards the bottom in the focal plane.

The same simplified bulk material discharge device could also be realized in the variation according to FIG. 1, namely if the funnels or grooves of the (lower) flow-past base (6B) are arranged offset by a gap against the funnels or grooves of the (upper) flow-past base (6A). In this particular instance, the bulk material discharge tubes (9A) do not penetrate the intersection area of the distribution elements (8), but the contact area of adjacent funnels or grooves. This alternative possibility is illustrated as an alternative in broken lines in the lower right corner of FIG. 4a.

FIGS. 7a to 7c show an alternative variation (2nd variation) of a fluidized bed reactor arrangement (1) according to the invention. In this particular example, the bulk material is not only discharged from the two reaction chambers (5A and 5B) separately from each other, but both reaction chambers (5A and 5B) are loaded with fresh bulk material from a common supply bin (3A). For this purpose, upwardly open, in particular funnel-shaped expanded bulk material distribution tubes (34B) are provided that lead towards the bottom from the supply bin (3A) and are guided through the bulk material distribution base (4A) of the supply bin (3A) as well as through one (shown) or more (not shown) reaction chambers (5A) arranged below the reaction chamber (5B) to be loaded and through the corresponding flow-past base (6A) in a concentric manner. In this particular example, the bulk material distribution tubes (34B) are guided through the center of the bulk material throughput openings (7A) of the flow-past base (6A). It is also possible to guide the bulk material distribution tubes (34B) through the (upper) flow-past base (6A) at the contact points of adjacent funnels or grooves.

In this particular example, a similar arrangement of the tubes that convey the bulk material results below the (upper) flow-past base (6A) as explained in connection with the (lower) flow-past base (6B) according to FIG. 1. The difference, as compared to the problems in FIG. 1, can be seen in the fact that, according to FIG. 7a, the bulk material is not discharged from the bulk material distribution tube (34B) by a bulk material discharge device, but must be conveyed to the (lower) reaction chamber (5B). This is the reason why the bulk material throughput openings (7A) of the (upper) flow-past base (6A) are connected to the bulk material discharge tube (9A) by insertion of a Y-shaped tube connector (35). The bulk material distribution tube (34B) that is arranged between the bulk material throughput openings (7A) opens into the gore area of the Y-tube connector (35) so that the bulk material from the bulk material tube (34b) can be laterally discharged from the Y-tube connector (35) offset by 90 degrees and can be introduced into the (lower) reaction chamber (5B).

A further special feature in FIG. 7a is an intermediate base (36) that is arranged below the (upper) flow-past base (6A) and prevents the fluid penetration from the reaction chamber (5B) arranged below this flow-past base (6A) into the reaction chamber (5A) arranged above this flow-past base (6A). In this particular instance, each reaction chamber is provided with separate fluid intakes (37A or 37B) and separate fluid outlets (38A or 38B). Such intermediate bases and separate fluid intakes and outlets for each reaction chamber can, of course, be realized in all variations of the fluidized bed reactors according to the invention.

According to FIG. 7a, all fluid intakes are charged with the same raw gas at (37). This particular variation is thus particularly suitable to realize a multiple of such reaction chamber cross sections within a relatively small base area.

The remaining details of this second variation correspond to the first variation, according to FIG. 1.

The specialty in FIG. 8 (3rd variation of a fluidized bed reactor arrangement) consists of the fact that several supply bins (3A and 3B) are provided independent of each other and arranged on top of each other. In order to make it possible that the reaction chambers (5A and 5B) that are arranged below each other can be loaded with different bulk materials, this particular example suggests that—other than in the second variation according to FIG. 7a—the bulk material distribution tubes (34) are also guided through the supply bin (3A) arranged below the (upper) supply bin (3B).

A further specialty in FIG. 8 consists of the fact that the fluid outlet (38B) of the (lower) reaction chamber (5B) is connected with the fluid intake (37A) of the (upper) reaction chamber (5A). This means that one single fluid flows successively through both reaction chambers, in which the fluid can be treated by different bulk materials in each of the reaction chambers. This series arrangement of the fluid can of course also be realized in all of the other variations. An intermediate treatment of the fluid can be executed in the bypass line (38B,37A) of the intermediate base (36), for example a Jet treatment with $NH_3$. Such a treatment is suitable for the cleaning of flue gas from which sulfur oxide and nitrogen oxide are removed successively. The possibility of using different bulk materials for the $SO_x$ or $NO_x$ separation in both reaction chambers provides the advantage of using the optimal bulk materials for the corresponding fluid treatment, for example an activated charcoal, as manufactured by Bergbauforschung GmbH (BF) for the $SO_2$-separation in the lower reaction chamber and an open-hearth activated charcoal, as manufactured by the Rheinbraun company for the $NO_x$-separation in the lower reaction chamber.

FIG. 9a shows a first possibility for the arrangement of two bulk material collection funnels (10A and 10B) below each other below the lowermost flow-past base. For this purpose, the bulk material discharge tube (9A) by means of which bulk material is discharged from the upper one of the two reaction chambers that are arranged on top of each other or an extension piece (69) of the bulk material discharge tube (9A) is guided through the (upper) bulk material collection funnel (10B) into the (lower) bulk material collection funnel (10A). The lower tube opening of the (upper) bulk material collection funnel (10A) is guided through the (lower) bulk material collection funnel (10B) in a corresponding manner.

FIG. 9b shows how it is possible to accommodate the bulk material discharge devices for the different reaction chambers that are arranged on top of each other only within the (upper) bulk material collection funnel (10B) only, despite the fact that two bulk material collection funnels are provided. The bulk material discharge device according to FIG. 4c is also very suitable for this purpose. Only the baffle plates (19 and 24) for the two bulk material discharge devices must be dimensioned correspondingly, which means that the (upper) baffle plate (19) must be longer than the (lower) baffle plate (24) and the extension piece (69) at the upper end of the opening must be sufficiently large or sufficiently expanded in its cross section in order to collect the bulk material discharged from the baffle plate (24) by the slider (26) without mixing the same with the bulk material discharged by the upper baffle plate. The bulk material discharge device according to FIG. 9b is illustrated as an enlarged detail of FIG. 9a and offset by 90 degrees in order to create a better overview.

FIG. 10 shows an alternative variation as compared to FIG. 9, in which bulk material discharge devices that operate independently from each other are provided in each one of the two bulk material collection funnels (10A or 10B), which however are otherwise constructed in the same manner as the previously described bulk material discharge devices.

The bulk material collection funnels from the fluid flow-past chamber below the lowermost flow-past base can be fluidly separated by an intermediate wall (40).

Instead of the bulk material discharge devices according to FIG. 4c or FIGS. 6a/b, it is also possible to assign one bulk material collection container each for the single bulk material discharge openings or two adjacent bulk material discharge openings. This bulk material collection container can be constructed in the form of a tube section that is open on the top and the bottom and/or is arranged between two bases that are provided with bulk material throughput openings at predetermined locations, in which one and/or both of the bases and/or the tube sections are arranged in such a that they can be moved horizontally relative to each other or relative to the bulk material discharge openings of the reaction chambers.

FIGS. 11 and 12a to 12c show two alternative variations (4th and 5th variation) of a fluidized bed reactor arrangement, in which a separate supply bin (3A and 3B) is provided immediately below each reaction chamber in both instances. Bulk material distribution tubes (34) for the loading of the lower supply bin (3B) with bulk material extend towards the bottom from the higher supply bin (3A) and are guided through the upper reaction chamber (5A) and the assigned flow-past base (6A).

Horizontal conveyers (41) are provided for the loading of the supply bins (3A) in FIG. 12a ff.

In FIGS. 11 to 13b, the cross sections of the bulk material distribution tubes (34) and the bulk material discharge tubes are dimensioned and arranged in at least the area of the flow-past bases or the bulk material distribution bases in such a way that they take over the function of the funnel module that was omitted at this particular location.

The fourth variation shown in FIG. 11 suggests that the bulk material from the (upper) reaction chamber (5A) is collected directly below the assigned flow-past base (6A) in preferably several bulk material collection funnels (10A) and guided from there into the lower reaction chamber (5B) and the assigned flow-past base (6B) through the extension pieces (39A). The extension pieces (39A) are constructed in the shape of a shaft and have the same cross section as the funnel modules for the bulk material distribution bases (4B) or the flow-past bases (6B). It is also possible to provide an intermediate base (44) in order to seal the supply bin (3B) toward the top.

The 5th variation according to FIGS. 12a and 12c utilizes horizontal conveyors (41) for the bulk material distribution and horizontal conveyors (45) for the bulk material discharge. Chain conveyors are particularly suitable for this purpose. The horizontal conveyors (45) for the bulk material discharge are arranged at the discharge end of groove-shaped bulk material discharge grooves (10B) and are preferably covered by the bulk material distribution elements (46) which form the bulk material discharge gaps (47) together with the side walls of the grooves (10B). The bulk material falls through these discharge gaps onto the lower section (45B) of the horizontal conveyor (45). A further difference, as compared to the 4th variation according to FIG. 11, can be seen in the fact that the loading of the (lower) supply bin is equalized in regard to the corrugation of the bulk material surface and that the bulk material distribution tubes (34) are branched at their lower end in a Y-shape or a similar manner.

In order to realize the largest possible flow-past surfaces within the smallest possible space and provide the possibility of modular construction, the 5th and 6th variation (FIGS. 12a to 12c or 13a/b) suggest that a fluid guidance housing (48) is arranged between adjacent blocks (modules) (1A and 1B) which allows the common fluid distribution and the common fluid discharge to and from several reaction chambers of the fluidized bed reactor arrangement (1). For this purpose, the fluid guidance housing is separated into a fluid distribution room (48A) and a fluid discharge room (48B) by a separation wall (49) in such a way that all fluid intakes (37A and 37B) for the reaction chambers (5A and 5B) are assigned to the fluid distribution room (48A) and all fluid outlets (38A and 38B) are assigned to the fluid discharge room (48B). This arrangement can be seen in the right quarter of FIG. 12c.

In the left half of FIG. 12c, the view of the different elements within the arrangement blocks beyond the fluid guidance housing are drawn in broken lines in order to create a better overview. Compared to FIG. 12a, in which the viewing angle is offset by 90 degrees, this example shows the Y-shaped separation of the bulk material distribution tubes (34) into a total of four partial tubes or partial slides. A comparison to FIG. 12b shows that each of these partial tubes supplies six funnel modules with bulk material. These funnel modules are only indicated by an x-shaped cross in order to create a better overview.

Such fluidized bed reactor arrangements (as well as the variations according to FIGS. 13a/b) are particularly suitable for large reactors.

FIGS. 13a and 13b show a sixth variation of how the bulk material distribution for the (lower) reaction chambers (5B) can be realized in fluidized bed reactor arrangements with large surface flow-past bases (6A/B). For this purpose, a system of branching tubes (50A to 50E) is provided at the lower end of the bulk material distribution tubes (34), in which only the upper ends of the branching tubes (50A and 50D) are connected to the lower end of the bulk material distribution tubes (34), while the branching tubes (50B, 50C and 50E) diverge from the branching tubes (50A and 50D). FIG. 13b shows that an array of 24 funnel modules can be supplied with bulk material through one single bulk material distribution tube (34), in which one separate branching tube is assigned to each funnel module. This results in a particularly simple, functionally safe and space saving bulk material distribution with a beneficial arrangement of the bulk material surface in the concerned reaction chamber and the second (lower) supply bin can be omitted. The branching tubes (50A to 50E) also form a bulk material distribution base (48). All other components in this example correspond with the ones in the fifth variation (according to FIGS. 12a to 12c). The side wall of the arrangement block (1A) in the third quarter of the figure (from the left) was thus also omitted in this example in order to create a better overview.

The previous text is intended to explain that the term "bulk material distribution base" according to the invention represents any arrangement for the more or less even distribution of bulk material over the reactor cross section, and even if it does not concern a "base", but a similarly working system of branching tubes or similar devices.

List of reference symbols 1 fluidized bed reactor arrangement
1A/B arrangement blocks
2 bulk material
3A supply bin
3B supply bin
4A bulk material distribution base
4B bulk material distribution base
5A reaction chamber
5B reaction chamber
6A flow-past base
6B flow-past base
7A bulk material throughput openings
7B bulk material throughput openings
8 distribution elements
9A bulk material discharge tubes
9B bulk material discharge tubes
10A bulk material collection funnel/grooves
10b bulk material collection funnel/grooves
11 side walls
12 side walls
13 side walls
14 side walls
15 fluid throughput openings
16 fluid throughput openings
17 fluid throughput openings
18 gap
19 baffle plate
20 baffle plate
21 transverse brace
22 push/pull element
23 slider
24 baffle plates
25 baffle plates
26 slider
27 perforations
28 lower funnel/grooves
29 upper funnel/grooves
30 intermediate funnel/grooves
31 slider plate
32 throughput openings
33 throughput openings
34 bulk material distribution tubes
34A bulk material distribution tubes
34B bulk material distribution tubes
35 Y-tube connector
36 intermediate base
37 fluid intake
37A fluid intakes
37B fluid intakes
38 fluid outlet
38A fluid outlets
38B fluid outlets
39A extension piece
40 intermediate base
41 horizontal conveyer
42 outlet openings
43A bulk material discharge device
43B bulk material discharge device
44 intermediate base
45 horizontal conveyor
45A/B upper/lower section
46 bulk material distribution elements
47 bulk material outlet gap
48 fluid guidance housing
48A fluid introduction room
48B fluid discharge room
49 separation wall
50A to 50E branch tubes
A top view B top view
C top view
D top view
E top view
F top view
G top view
H top view
I claim:

1. A moving bed reactor for treating a fluid by means of a downwardly flowable bulk material, comprising:
   a) a pair of upright reaction chambers comprising an upper reaction chamber and a lower reaction chamber arranged below the upper reaction chamber;
   b) a bulk material intake means and a bulk material outlet means for the throughput of bulk material downwards through said reaction chambers;
   c) a fluid intake means and a fluid outlet means for the throughput of fluid through the bulk material within each reaction chamber;
   d) a bulk material distribution base for said upper reaction chamber for distributing bulk material over the cross section of said upper reaction chamber;
   e) a flow-past base contiguous with the bottom of each reaction chamber for distributing fluid across the cross-section of each reaction chamber, each flow-past base comprising means to accommodate the downward-throughput of bulk material past the base;
   f) a bulk material discharge means arranged below the upper reaction chamber flow-past base for discharging a part of the bulk material from the upper reaction chamber, said bulk material discharge means extending downwardly through the lower reaction chamber and the lower reaction chamber flow-past base; and
   g) a control means comprising;
      i) a first actuatable control associated with said bulk material discharge means of the upper reaction chamber to control the discharge of bulk material from said bulk material discharge means,
      ii) a second actuatable control associated with said lower reaction chamber to control the discharge of bulk material from said lower reaction chamber, said first and second controls being independently actuatable.

2. The reactor of claim 1 further comprising a bulk material distribution means extending through said upper reaction chamber adapted to receive bulk material from said bulk material intake means and to introduce said received bulk material directly into said lower reaction chamber.

3. The reactor of claim 1 comprising multiple pairs of upper and lower reaction chambers in a parallel relationship wherein the first actuatable control means of the multiple upper reaction chambers to control the discharge of bulk material from said bulk material discharge means are actuatable together, and the second actuatable control means of the multiple lower reaction chambers to control the discharge of bulk material from the multiple lower reaction chambers are actuatable together.

4. The reactor of claim 1 wherein said bulk material intake means comprises at least one bin arranged above said upper reaction chamber adapted to feed bulk material to the upper reaction chamber bulk material distribution base.

5. The reactor of claim 4 further comprising means for feeding bulk material from said bin directly to the lower reaction chamber.

6. The reactor of claim 4 wherein said bulk material intake means comprises plural bins arranged above said upper reaction chamber comprising means for feeding bulk material from one of said bins directly to the lower reaction chamber.

7. The reactor of claim 5 wherein the upper reaction chamber bulk material distribution base comprises a first group of distribution tubes, and the means for feeding bulk material directly to the lower reaction chamber is a second group of distribution tubes guided through said first group of distribution tubes.

8. The reactor of claim 7 wherein said second group of distribution tubes is guided through said bulk material discharge means arranged below the upper reaction chamber.

9. The reactor of claim 1 wherein said bulk material intake means comprises a first bulk material bin above said upper reaction chamber and a second bulk material bin immediately above said lower reaction chamber comprising means for feeding said second bulk material bin from said first bulk material bin.

10. The reactor of claim 1 comprising a first collection means for said upper reaction chamber for collecting bulk material discharged from said bulk material discharge means, and a second collection means for said lower reaction chamber for collecting bulk material discharged from said lower reaction chamber.

11. The reactor of claim 1 wherein said bulk material discharge means comprises openings above the lower reaction chamber for a portion of the bulk material in the bulk material discharge means to flow into the lower reaction chamber.

12. The reactor of claim 1 wherein said bulk material discharge means comprises at least one downwardly extending tube, the upper end of said tube being positioned contiguous with but spaced below the upper reaction chamber flow-past base to receive at least apart of the bulk material flowing past the flow-past base.

13. The reactor of claim 12 comprising multiple tubes wherein said tubes are adjustable in elevation to adjust the space between the tube upper ends and the flow-past base.

14. The reactor of claim 12 wherein said tube upper end is truncated and expands in cross-section towards the top of said tube.

15. The reactor of claim 12 wherein said upper reaction chamber flow-past base comprises at least one opening for the downward flow of bulk material through the base and said tube upper end is displaced laterally with respect to said opening.

16. The reactor of claim 12 wherein said tube comprises at least one opening above the lower reaction chamber for a portion of the bulk material in the tube to flow into the lower reaction chamber.

17. The reactor of claim 12 wherein the fluid intake means is below the lower reaction chamber flow-past base and the fluid outlet means is above the upper reaction chamber flow-past base.

18. A process for the operation of a moving bed reactor comprising providing the reactor of claim 1, and withdrawing bulk material separately from said reaction chambers at an elevation below the elevation of the lowermost flow-past base.

19. A moving bed reactor for treating a fluid by means of a downwardly flowable bulk material comprising
   a) a pair of upright reaction chambers comprising an upper reaction chamber and a lower reaction chamber arranged below the upper reaction chamber;
   b) a bulk material intake means and a bulk material outlet means for the throughput of bulk material downwards through said reaction chambers;
   c) a fluid intake means and a fluid outlet means for the throughput of fluid through the bulk material within each reaction chamber;
   d) a bulk material distribution base for each reaction chamber for distributing bulk material over the cross-section of each reaction chamber;
   e) a flow-past base contiguous with the bottom of each reaction chamber for distributing fluid across the cross-section of each reaction chamber, each flow-past base comprising means to accommodate the downward throughput of bulk material past the base;
   f) a bulk material discharge means arranged below the upper reaction chamber flow-past base for discharging a part of the bulk material from the upper reaction chamber, said bulk material discharge means extending downwardly through the lower reaction chamber and the lower reaction chamber flow-past base;
   g) said fluid intake means comprising:
      i) a first fluid inlet means and a first fluid outlet means for the flow of fluid through the bulk material in the upper reaction chamber;
      ii) a second fluid inlet means and a second fluid outlet means for the flow of fluid through the bulk material in the lower reaction chamber;
      iii) partition means between said upper and lower reaction chambers to prevent the flow of fluid from one reaction chamber to the other; and
   h) said reactor further comprising a control means associated with said bulk material discharge means and with said lower reaction chamber for selectively controlling the discharge of bulk material from said bulk material discharge means and from said lower reaction chamber.

* * * * *